(12) United States Patent
Milne et al.

(10) Patent No.: US 10,856,097 B2
(45) Date of Patent: Dec. 1, 2020

(54) GENERATING PERSONALIZED END USER HEAD-RELATED TRANSFER FUNCTION (HRTV) USING PANORAMIC IMAGES OF EAR

(71) Applicant: Sony Corporation, Tokyo (JP)

(72) Inventors: James R. Milne, Ramona, CA (US); Gregory Peter Carlsson, Santee, CA (US)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 16/168,317

(22) Filed: Oct. 23, 2018

(65) Prior Publication Data
US 2020/0107148 A1 Apr. 2, 2020

Related U.S. Application Data

(60) Provisional application No. 62/737,196, filed on Sep. 27, 2018.

(51) Int. Cl.
| | |
|---|---|
| *G06K 9/62* | (2006.01) |
| *H04S 7/00* | (2006.01) |
| *G06T 7/70* | (2017.01) |
| *H04N 5/247* | (2006.01) |

(52) U.S. Cl.
CPC ............... *H04S 7/304* (2013.01); *G06T 7/70* (2017.01); *H04N 5/247* (2013.01); *G06T 2207/30196* (2013.01); *H04S 2420/01* (2013.01)

(58) Field of Classification Search
CPC .. H04S 2420/01; H04S 7/304; H04S 2400/01; H04S 2400/11; H04S 1/007; H04S 7/305; H04R 5/033; H04R 5/04

USPC ................. 382/209, 154; 348/77; 381/303
See application file for complete search history.

(56) References Cited

U.S. PATENT DOCUMENTS

| | | |
|---|---|---|
| 6,181,800 B1 | 1/2001 | Lambrecht |
| 6,795,556 B1 | 9/2004 | Sibbald et al. |
| 7,634,092 B2 | 12/2009 | McGrath |
| 7,720,229 B2 | 5/2010 | Duraiswami et al. |
| 7,840,019 B2 | 11/2010 | Slaney et al. |

(Continued)

FOREIGN PATENT DOCUMENTS

| | | |
|---|---|---|
| CN | 105027580 B | 5/2017 |
| CN | 107172566 B | 1/2019 |

(Continued)

OTHER PUBLICATIONS

Farina et al., "Measuring Spatial MIMO Impulse Responses in Rooms Employing Spherical Transducer Array", AES, 2016.

(Continued)

*Primary Examiner* — Charlotte M Baker
(74) *Attorney, Agent, or Firm* — John L. Rogitz

(57) ABSTRACT

Left and right ear HRTF coefficients are determined for an end user, one each for each of a plurality of head orientations, and provided to the end user on a portable recording medium, or via the Internet, etc. The user can then implement the files on audio played on the user's headphones, with the file corresponding to the user's head orientation being selected as the user moves his head to ensure the sound as perceived by the user remains emanating from a fixed external location. The user's personal HRTF may be generated using panoramic images of the ears, such as multiple 2D images or 3D imaging.

20 Claims, 5 Drawing Sheets

(56) References Cited

U.S. PATENT DOCUMENTS

| | | | |
|---|---|---|---|
| 8,452,036 B2 | 5/2013 | Sommer et al. | |
| 8,489,371 B2 | 7/2013 | Guillon et al. | |
| 8,503,682 B2 | 8/2013 | Fukui et al. | |
| 8,520,857 B2 | 8/2013 | Fukui et al. | |
| 8,787,584 B2 | 7/2014 | Nyström et al. | |
| 9,030,545 B2* | 5/2015 | Pedersen | G06K 9/00362 |
| | | | 348/77 |
| 9,101,279 B2* | 8/2015 | Ritchey | A61B 5/7264 |
| 9,118,488 B2 | 8/2015 | Donaldson | |
| 9,118,991 B2 | 8/2015 | Nystrom et al. | |
| 9,167,368 B2 | 10/2015 | Jong et al. | |
| 9,448,405 B2 | 9/2016 | Yamamoto | |
| 9,544,706 B1 | 1/2017 | Hirst | |
| 9,591,427 B1 | 3/2017 | Lyren et al. | |
| 9,740,305 B2 | 8/2017 | Kabasawa et al. | |
| 9,854,362 B1 | 12/2017 | Milne et al. | |
| 9,900,722 B2 | 2/2018 | Bilinski et al. | |
| 9,992,602 B1 | 6/2018 | Allen | |
| 10,003,905 B1 | 6/2018 | Milne et al. | |
| 10,149,089 B1 | 12/2018 | Edry et al. | |
| 10,154,365 B2 | 12/2018 | Silva | |
| 10,206,055 B1 | 2/2019 | Mindlin et al. | |
| 10,492,018 B1 | 11/2019 | Allen | |
| 2011/0137437 A1 | 6/2011 | Jonsson | |
| 2012/0014528 A1 | 1/2012 | Wang | |
| 2012/0201405 A1 | 8/2012 | Slamka et al. | |
| 2013/0169779 A1 | 7/2013 | Pedersen | |
| 2013/0170679 A1 | 7/2013 | Nystrom et al. | |
| 2013/0177166 A1 | 7/2013 | Agevik et al. | |
| 2013/0208899 A1 | 8/2013 | Vincent et al. | |
| 2015/0010160 A1 | 1/2015 | Udesen | |
| 2015/0063610 A1 | 3/2015 | Mossner | |
| 2015/0106475 A1 | 4/2015 | Tan et al. | |
| 2015/0256613 A1 | 9/2015 | Walker et al. | |
| 2015/0293655 A1 | 10/2015 | Tan | |
| 2015/0347735 A1 | 12/2015 | Yamashita | |
| 2016/0100268 A1 | 4/2016 | Stein et al. | |
| 2016/0124707 A1 | 5/2016 | Ermilov et al. | |
| 2016/0142848 A1 | 5/2016 | Saltwell | |
| 2016/0269849 A1 | 9/2016 | Riggs et al. | |
| 2017/0094440 A1 | 3/2017 | Brown et al. | |
| 2017/0332186 A1 | 11/2017 | Riggs et al. | |
| 2018/0091921 A1 | 3/2018 | Silva | |
| 2018/0136898 A1 | 5/2018 | Shi et al. | |
| 2018/0139565 A1 | 5/2018 | Norris et al. | |
| 2018/0249276 A1 | 8/2018 | Godfrey | |
| 2018/0310115 A1 | 10/2018 | Romigh | |
| 2019/0007725 A1 | 1/2019 | Ferrer | |
| 2019/0215637 A1 | 7/2019 | Lee et al. | |
| 2020/0107149 A1 | 4/2020 | Sunder et al. | |

FOREIGN PATENT DOCUMENTS

| | | |
|---|---|---|
| JP | 5285626 B2 | 9/2013 |
| JP | 2017092732 A | 5/2017 |
| WO | 2017116308 A1 | 7/2017 |
| WO | 2018110269 A1 | 6/2018 |
| WO | 2019059558 A1 | 3/2019 |

OTHER PUBLICATIONS

Milne et al., "Techniques Combining Plural Head-Related Transfer Function (HRTF) Spheres to Place Audio Objects", related U.S. Appl. No. 16/424,983, Non-Final Office Action dated May 15, 2020.

Milne et al., "Techniques Combining Plural Head-Related Transfer Function (HRTF) Spheres to Place Audio Objects", related U.S. Appl. No. 16/424,983, Applicant's response to Non-Final Office Action filed May 27, 2020.

Milne et al., "Generating Personalized End User Room-Related Transfer Function (RRTF)", file history of related U.S. Appl. No. 16/681,632, filed Nov. 12, 2019.

Yarra 3DX: The Most Advanced 3D Audio System In The World, Jul. 2016, retrieved from https://www.kickstarter.com/projects/yarra3dx/yarra-3dx-the-most-advanced-3d-audio-system-in-the.

Mohapatra et al., "Generating Personalized End User Head-Related Transfer Function (HRTF) from Generic HRTF", related U.S. Appl. No. 16/662,995, Non-Final Office Action dated Apr. 29, 2020.

Mohapatra et al., "Generating Personalized End User Head-Related Transfer Function (HRTF) from Generic HRTF", related U.S. Appl. No. 16/662,995, Applicant's response to Non-Final Office Action filed May 5, 2020.

Milne et al., "Generating Personalized End User Head-Related Transfer Function (HRTF) from Generic HRTF", file history of related U.S. Appl. No. 16/662,995, filed Oct. 24, 2019.

Politis et al., "Applications of 3D spherical transforms to personalization of head-related transfer functions", 2016 IEEE International Conference on Acoustics, Speech and Signal Processing (ICASSP), Mar. 2016.

James R. Milne, Gregory Carlsson, Tonni Sandager Larsen, "Global HRTF Repository", file history of related U.S. Appl. No. 16/424,313, filed May 28, 2019.

James R. Milne, Gregory Carlsson, Tonni Sandager Larsen, "Head Related Transfer Function (HRTF) as Biometric Authentication", file history of related U.S. Appl. No. 16/440,288, filed Jun. 13, 2019.

James R. Milne, Gregory Peter Carlsson, "Techniques Combining Plural Head-Related Transfer Function (HRTF) Spheres to Place Audio Objects", file history of related U.S. Appl. No. 16/424,983, filed May 29, 2019.

Sridhar et al., "A Database of Head-Related Transfer Function and Morphological Measurements", Audio Engineering Society, Oct. 2017, New York.

Thibaut Carpentier. "Binaural synthesis with the Web Audio API". 1st Web Audio Conference (WAC), Jan. 2015, Paris, France. hal-01247528.

"Hear an Entirely New Dimension of Sound", OSSIC, Retrieved from https://www.ossic.com/3d-audio/.

Dmitry N. Zotkin, Jane Hwang, Ramani Duraiswami, Larry S. Davis, "HRTF Personalization Using Anthropometric Measurements", Perceptual Interfaces and Reality Laboratory Institute for Advanced Computer Studies (UMIACS), University of Maryland (2003).

Henrik Moller, "Fundamentals of Binaural Technology", Acoustics Laboratory, Aalborg University, Mar. 3, 1992, Aalborg, Denmark.

Slim Ghorbal, Renaud Seguier, Xavier Bonjour, "Process of HRTF Individualization by 3D Stastical Ear", Audio Engineering Society, Convention e-Brief 283, Presented at the 141st Convention, Sep. 29-Oct. 2, 2016, Los Angeles, CA.

Sylvia Sima, "HRTF Measurements and Filter Designs for a Headphone-Based 3D-Audio System", Faculty of Engineering and Computer Science, Department of Computer Science, University of Applied Sciences, Hamburg, Germany, Sep. 6, 2008.

James R. Milne, Gregory Peter Carlsson, "Generating Personalized End User Head-Related Transfer Function (HRTF) Using Panoramic Images of Ear", file history of related U.S. Appl. No. 16/168,317, filed Oct. 23, 2018.

James R. Milne, Gregory Carlsson, Tonni Sandager Larsen, "Global HRTF Repository", related U.S. Appl. No. 16/424,313, Non-Final Office Action dated Aug. 6, 2020.

James R. Milne, Gregory Carlsson, Tonni Sandager Larsen, "Global HRTF Repository", related U.S. Appl. No. 16/424,313, Applicant's response to Non-Final Office Action filed Sep. 17, 2020.

Milne et al., "Techniques Combining Plural Head-Related Transfer Function (HRTF) Spheres to Place Audio Objects", related U.S. Appl. No. 16/424,983, Final Office Action dated Sep. 18, 2020.

Mohapatra et al., "Generating Personalized End User Head-Related Transfer Function (HRTF) from Generic HRTF", related U.S. Appl. No. 16/662,995, Non-Final Office Action dated Jul. 31, 2020.

Mohapatra et al., "Generating Personalized End User Head-Related Transfer Function (HRTF) from Generic HRTF", related U.S. Appl. No. 16/662,995, Applicant's response to Non-Final Office Action filed Sep. 15, 2020.

* cited by examiner

US 10,856,097 B2

1

GENERATING PERSONALIZED END USER HEAD-RELATED TRANSFER FUNCTION (HRTV) USING PANORAMIC IMAGES OF EAR

FIELD

The present application relates generally to generating personalized end user head-related transfer functions (HRTF) using panoramic images of the ear.

BACKGROUND

Binaural or head-related transfer function (HRTF) calibration currently requires expensive equipment made by specialized manufacturers.

SUMMARY

As understood herein, while the use of microphones in the ears which record sounds from various speaker positions may be used to derive a HRTF, this is costly and time consuming due to the amount of equipment required. As also recognized herein using an image of the ear that is processed by a machine learning engine may require the person to take a photograph of himself, which is not easy to do well and in any case results in an image of a 3D object in only two dimensions, which confounds analysis.

Accordingly, techniques are described to make it easier for an end user to record a detailed photo of his ears with an eye to deriving a HRTF from that photo and to provide more detailed modelling data of the ears for machine learning to better create a personalized HRTF. In one technique a wireless communication device (WCD) such as a wireless telephone or tablet computer captures a panoramic image of each ear that is uploaded to a server (e.g., via a website) hosting a machine learning engine to derive a HRTF based on the uploaded images of the ear. Essentially a series of pictures is taken in the manner of making a panorama picture, and the pictures are stitched together.

In another technique a WCD has a stereoscopic camera system onboard to capture 3D images of the ears, which are uploaded to a server for further analysis. In yet another technique an application is provided to the WCD to both receive the images of the ears and execute machine learning on the images to derive one or more HRTFs, which may in turn be uploaded to a network server for storage and distribution. Once the HRTF is created, the customer may use it with any device that he owns, rents, or shares to listen to audio.

Another embodiment is an application on a phone that performs a comprehensive method to model a user's ear. The application captures images of the ears, analyzes the images, and creates a personalized HRTF for the user. The HRTF may be uploaded to the cloud for storage or distribution.

Yet another embodiment includes a combination of any two or more of the foregoing embodiments/techniques.

Accordingly, a system includes at least one computer medium that is not a transitory signal and that includes instructions executable by at least one processor to receive a series of at least first and second photographs of a person's ear from at least first and second camera positions. The instructions are executable to, based at least in part on the series of at least first and second photographs, generate a head-related transfer function (HRTF) to be applied to audio for the person's ear.

2

In example embodiments, the series includes a panoramic set of photographs of the person's ear. The series may include a three-dimensional (3D) image of the person's ear. The computer medium may be instantiated in a network server receiving the series from an end user communication device, or the computer medium may be instantiated in an end user communication device generating the series. The end user communication device may include at least first and second cameras configured to simultaneously image a region of a person to generate a 3D image.

In another aspect, a method includes receiving at least one photograph of a region of a person's ear. The photograph includes at least one three-dimensional (3D) image or at least two two-dimensional (2D) images from at least first and second camera positions. The method includes, based at least in part on the at one photograph, generating a head-related transfer function (HRTF) to be applied to audio for the person's ear.

In another aspect, a system includes at least one processor and at least one computer storage accessible to the at least one processor and including at least one database associating images of ears with respective head-related transfer functions (HRTFs). The system also includes at least one camera sending images to the at least one processor, which is programmed with instructions to use the at least one image as entering argument to the at least one database, identify in the at least one database a closest match to the at least one image, and return at least one HRTF associated with the closest match.

The details of the present application, both as to its structure and operation, can be best understood in reference to the accompanying drawings, in which like reference numerals refer to like parts, and in which:

DETAILED DESCRIPTION

Figure 1:
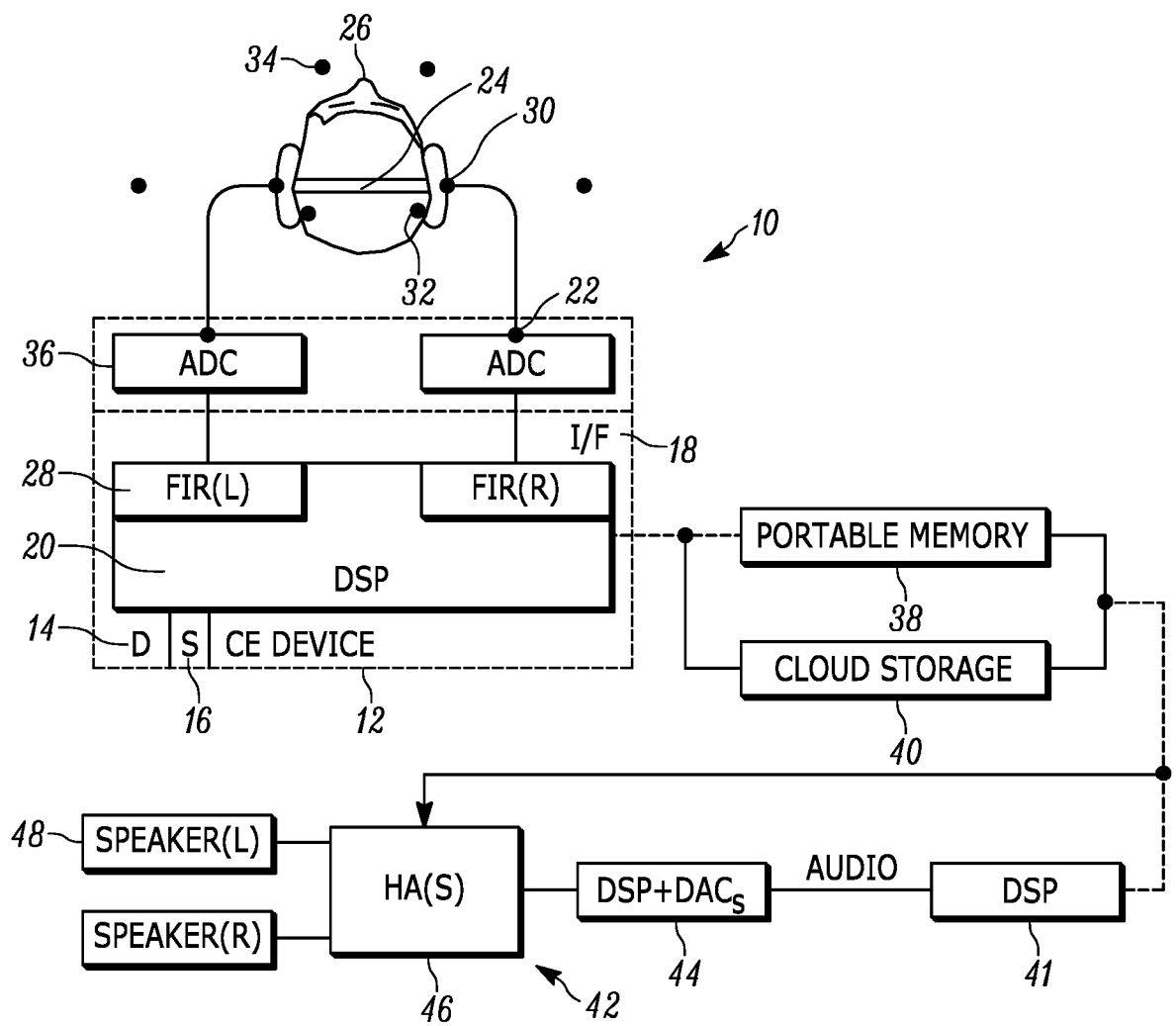
FIG. 1 is a block diagram of an example HRTF recording and playback system.

U.S. Pat. No. 9,854,362 is incorporated herein by reference and describes details of finite impulse response (FIR) filters mentioned below. U.S. Pat. No. 10,003,905, incorporated herein by reference, describes techniques for generating head related transfer functions (HRTF) using microphones.

This disclosure accordingly relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs. Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A. B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is an example of a device that may be configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, and one or more speakers 16 for outputting audio in accordance with present principles. The example CE device 12 may also include one or more network interfaces 18 for communication over at least one network such as the Internet, a WAN, a LAN, etc. under control of one or more processors 20 such as but not limited to a DSP. It is to be understood that the processor 20 controls the CE device 12 to undertake present principles, including the other elements of the CE device 12 described herein. Furthermore, note the network interface 18 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 22 such as, e.g., a USB port to physically connect (e.g. using a wired connection) to another CE device and/or a headphone 24 that can be worn by a person 26. The CE device 12 may further include one or more computer memories 28 such as disk-based or solid-state storage that are not transitory signals on which is stored files such as the below-mentioned HRTF calibration files. The CE device 12 may receive, via the ports 22 or wireless links via the interface 18 signals from first microphones 30 in the earpiece of the headphones 24, second microphones 32 in the ears of the person 26, and third microphones 34 external to the headphones and person, although only the headphone microphones may be provided in some embodiments. The signals from the microphones 30, 32, 34 may be digitized by one or more analog to digital converters (ADC) 36, which may be implemented by the CE device 12 as shown or externally to the CE device.

As described in the referenced U.S. patents above, the signals from the microphones can be used to generate HRTF calibration files that are personalized to the person 26 wearing the calibration headphones. A HRTF calibration file typically includes at least one and more typically left ear and right ear FIR filters, each of which typically includes multiple taps, with each tap being associated with a respective coefficient. By convoluting an audio stream with a FIR filter, a modified audio stream is produced which is perceived by a listener to come not from, e.g., headphone speakers adjacent the ears of the listener but rather from relatively afar, as sound would come from an orchestra for example on a stage that the listener is in front of.

To enable end users to access their personalized HRTF files, the files, once generated, may be stored on a portable memory 38 and/or cloud storage 40 (typically separate devices from the CE device 12 in communication therewith, as indicated by the dashed line), with the person 26 being given the portable memory 38 or access to the cloud storage 40 so as to be able to load (as indicated by the dashed line) his personalized HRTF into a receiver such as a digital signal processor (DSP) 41 of playback device 42 of the end user. A playback device may include one or more additional processors such as a second digital signal processor (DSP) with digital to analog converters (DACs) 44 that digitize audio streams such as stereo audio or multi-channel (greater than two track) audio, convoluting the audio with the HRTF information on the memory 38 or downloaded from cloud storage. This may occur in one or more headphone amplifiers 46 which output audio to at least two speakers 48, which may be speakers of the headphones 24 that were used to generate the HRTF files from the test tones. U.S. Pat. No. 8,503,682, owned by the present assignee and incorporated herein by reference, describes a method for convoluting HRTF onto audio signals. Note that the second DSP can implement the FIR filters that are originally established by the DSP 20 of the CE device 12, which may be the same DSP used for playback or a different DSP as shown in the example of FIG. 1. Note further that the playback device 42 may or may not be a CE device.

In some implementations, HRTF files may be generated by inputting, for example, to a machine learning module, or by accessing a database using as input, a series of photographs of a person's left and right ears taken from different positions and/or a three-dimensional (3D) image of the ears. Using the photographs, the machine learning module outputs a HRTF, preferably one for each ear.

Figure 2:
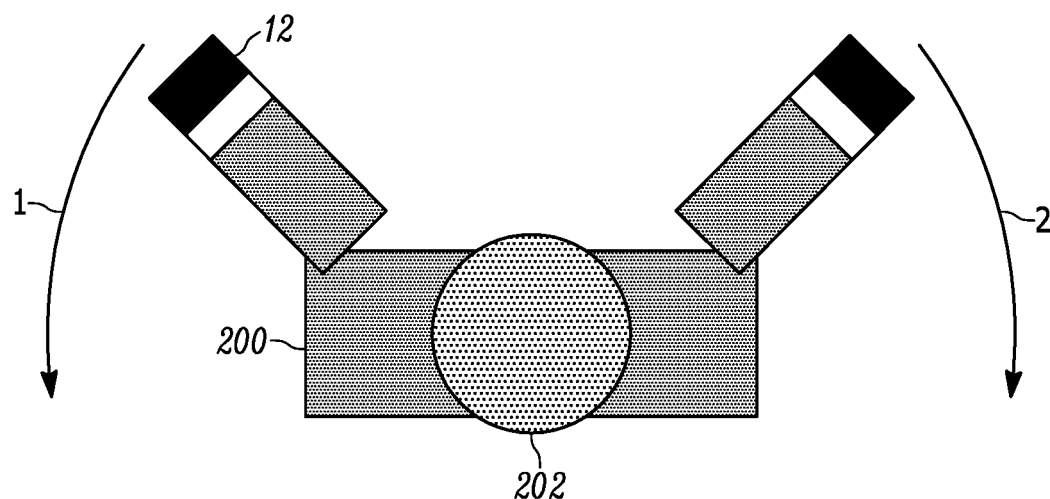
FIG. 2 is a schematic top plan view of a person taking a panorama of 2D images of his head and ears and/or 3D images of the head and ears.

FIG. 2 illustrates an example. A person 200 can hold the device 12 in his left hand at arm's length about 45 degrees in front of his head 202. The person can start taking photographs (or can commence taking a video) as the person, with left extended, moves the left arm back along the horizontal plane until the left arm is essentially oriented perpendicular to the left ear, with the person 202 looking straight ahead. This process can be repeated for the right ear using the right arm as shown. The series of photographs of each ear is essentially a panorama of the ear.

Figure 3:
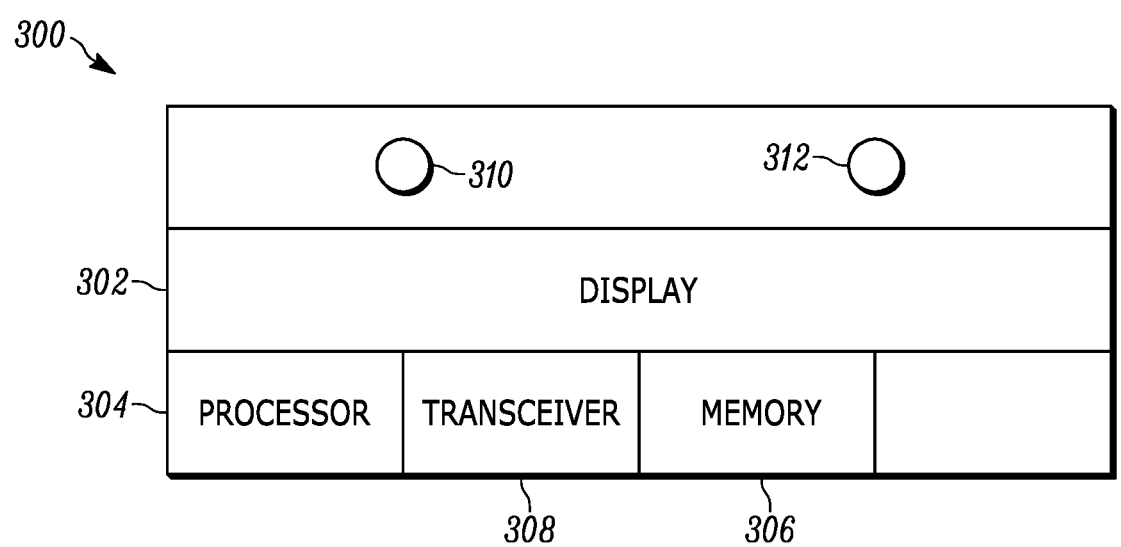
FIG. 3 is a schematic diagram of a wireless communication device such as a wireless telephone or tablet computer consistent with present principles.

In addition, or alternatively, the person may employ a device 300 that in all essential respects is identical to the device 12 shown in FIG. 1, e.g., the device 300 in FIG. 3 may include a display 302, a processor 304 accessing a computer storage medium 306, a wireless transceiver 308, etc. Also, as shown, the device 300 may include plural imaging devices such as cameras 310, 312 (only two cameras shown, it being understood that more than two cameras may be provided). The cameras 310, 312 may be controlled, e.g., using a single shutter button or key so that they take photographic images simultaneously, and the images can be combined to render 3D images.

Figure 4:
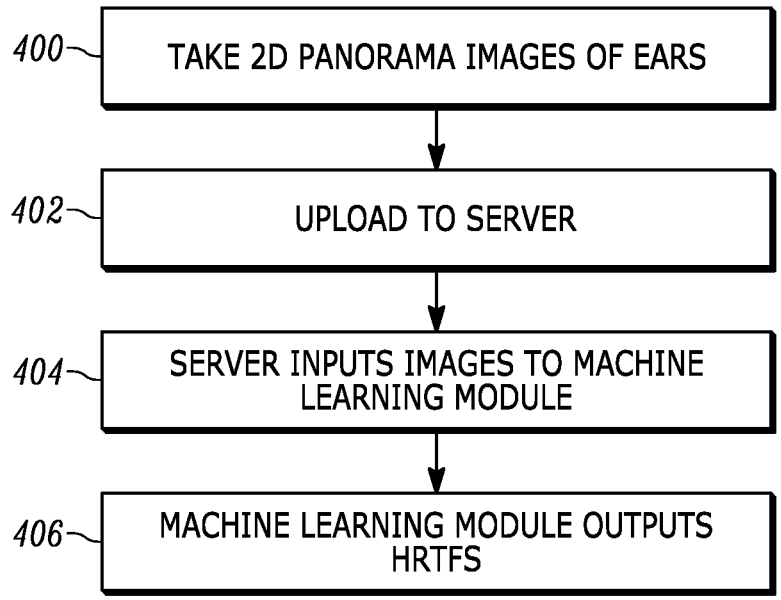
FIGS. 4-6 are flow charts of example logic consistent with present principles.

Moving to FIG. 4, at block 400 a person or an assistant takes a panorama set of photographs of the person's ears as described above. The photographs may be 2D. The set of panoramic photos is uploaded to a server via the Internet at block 402, and the server at block 404 inputs the photographs to a module that generates or otherwise returns HRTFs at block 406 based on the photographs taken at block 400. The module may be considered to be a machine learning module.

In one example, the module at block 404 uses the photographs an entering argument to a database that correlates previous sets of photographs to HRTFs to find a closest match between photographs (and thus HRTFs) in the database to the photographs taken at block 400. Image recognition techniques may be used to find the closest match. The database may be created using acoustically-determined HRTFs using techniques, in some examples, set forth in one or more of the U.S. patents referenced herein on test subjects. Sets of panoramic photographs for those test subjects can then be taken and associated with the acoustically-generated HRTFs of the same subjects in the database.

In other examples, HRTFs may be generated at block 404 using machine learning on the set of photographs taken at block 400 to output HRTFs. Example techniques for doing this include using machine learning modules that generate HRTFs based on a single photograph as taught, for example, in U.S. Pat. No. 7,840,019, incorporated herein by reference.

Figure 5:
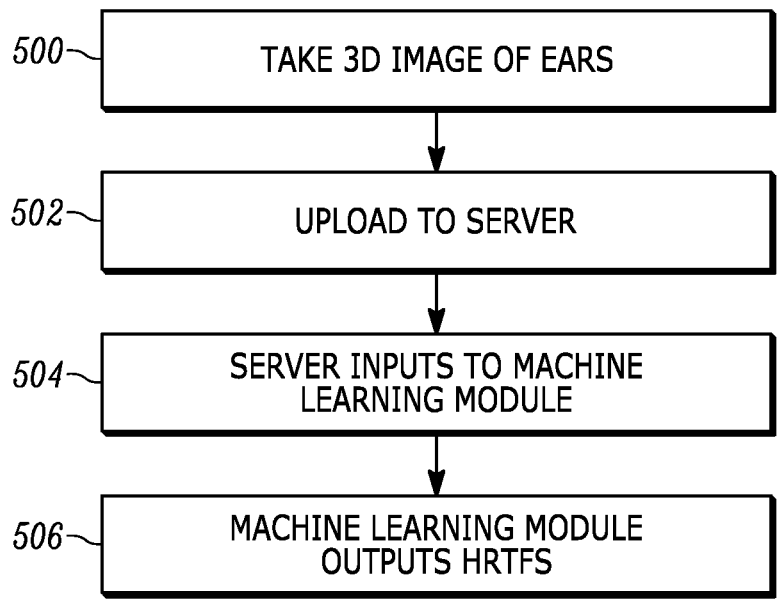

FIG. 5 illustrates logic that may be implemented using, for example, the stereoscopic camera device 300 in FIG. 3. At block 500 a person or an assistant takes one or more 3D images of the person's ears as described above. The photo or photos are uploaded to a server via the Internet at block 502, and the server at block 504 inputs the photographs to a module that generates or otherwise returns HRTFs at block 506 based on the photographs taken at block 500 consistent with techniques described above.

Figure 6:
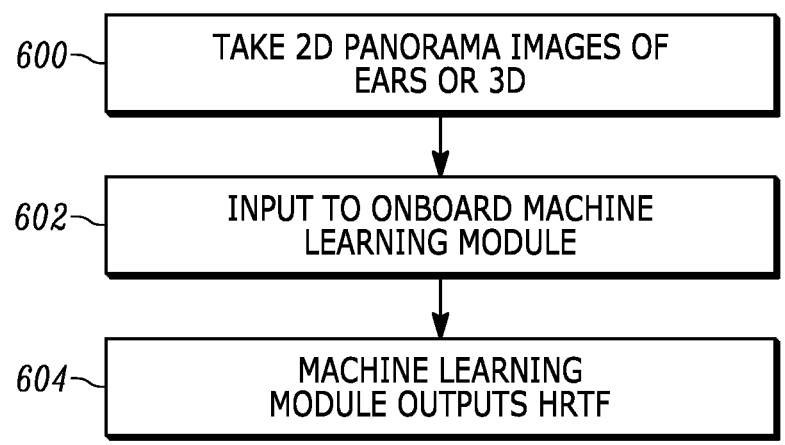

FIG. 6 illustrates logic that may be implemented using, for example, the stereoscopic camera device 300 in FIG. 3 or the 2D imaging device 12 shown in FIG. 1. At block 600 a person or an assistant takes one or more 3D images of the person's ears as described above, and/or takes a panoramic set of images of each ear. The photo or photos are processed onboard the device taking the photos at block 602 by inputting the photographs to a module that generates or otherwise returns HRTFs at block 604, consistent with techniques described above.

Figure 7:
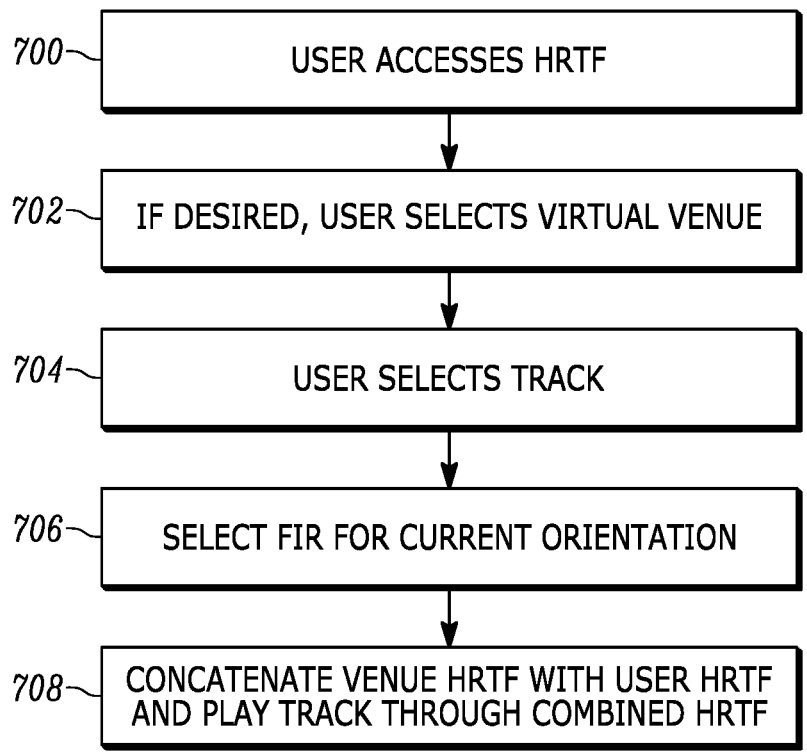
FIG. 7 is a flow chart of an example HRTF use logic consistent with present principles.

FIG. 7 illustrates example playback logic for using the personalized HRTF file(s) generated in FIGS. 4-6. At block 700, the end user accesses his personalized HRTF, e.g., by engaging the portable media 38 with the playback device 42, by accessing cloud storage 40 and linking the HRTF files thereon to the playback device 42, etc.

Moving to block 702, if desired the user may select a virtual venue in which to simulate playing the audio track desired by the user, which is selected at block 704. Head orientation signals from the user's headphones or from another source (such as a camera imaging the user) may be received at block 706, and the corresponding FIR filter from the HRTF files selected for the sensed orientation. When a virtual venue has been selected, at block 708 it is concatenated with the user-personalized FIR filter selected at block 704 corresponding to the user's head orientation and then the concatenation is convoluted with the selected audio track and played.

Note that the logic at block 708 may not use all of the taps of the FIR filter selected at block 706. In some implementations the user may be enabled to select the number of taps to use, it being understood that the greater the number of taps, the better the fidelity but the more burdensome the processing. Or, the playback device 42 may be limited as to how many taps it can process, and therefore may automatically use only some, but not all, of the FIR taps. For example, if a FIR filter has 64 taps but the playback device can process only 32 taps, the playback device may select every other tap in the FIR filter to use, discarding the rest.

As the user may from time to time turn his head, a new orientation is sensed, and a new FIR filter selected from the HRTF file at block 706. Note that if a user's head is at an orientation that itself is not exactly correlated with a FIR filter but hat is between two orientations that are correlated with respective FIR filters, the FIR filter of the orientation closest to the actual orientation may be used. Or, the coefficients of each of "N" corresponding taps of the adjacent FIR filters may be averaged in a weighted manner and a new FIR filter generated on the fly with the averaged coefficients. For example, if the coefficient of the $N^{th}$ tap of the filter associated with the orientation immediately to the left of the user's current orientation is "A", the coefficient of the $N^{th}$ tap of the filter associated with the orientation immediately to the right of the user's current orientation is "A", and the user's current orientation is exactly midway between the filter orientations, then the coefficient of the $N^{th}$ tap of a new FIR filter generated on the fly would be (A+B)/2. If the user's current orientation is 40% of the way from the "A" orientation and thus 60% of the way from the "B" orientation, the coefficient of the $N^{th}$ tap of a new FIR filter generated on the fly would be (0.6A+0.4B).

Figure 8:
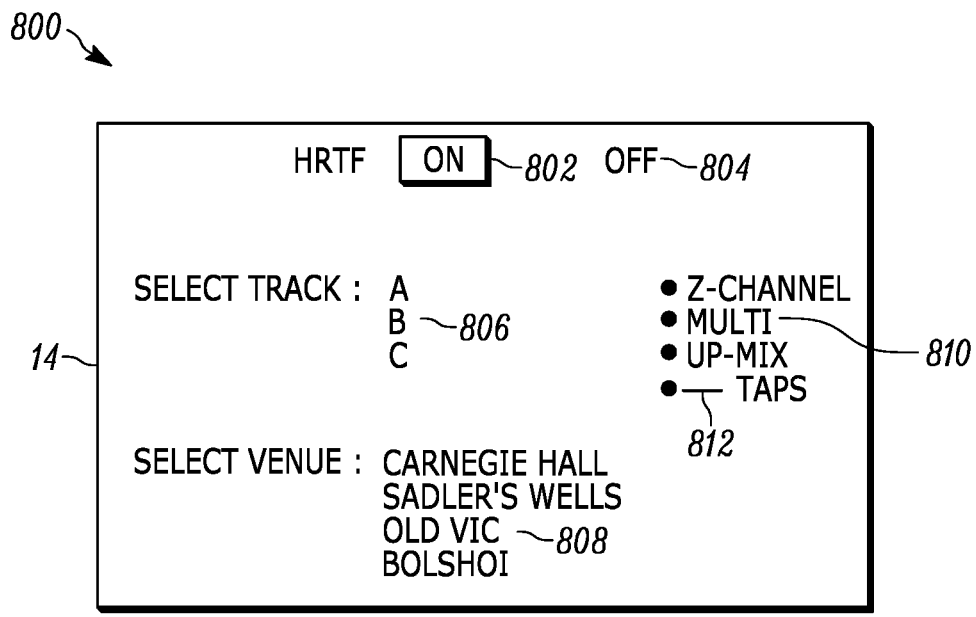
FIG. 8 is a screen shot of an example user interface (UI) consistent with present principles.

FIG. 8 illustrates a user interface (UI) 800 that may be presented on a display such as the display 14 shown in FIG. 1, consistent with present principles. The user may be given the option to turn the logic of FIG. 7 on and off by appropriately selecting on and off selectors 802, 804. If HRTF is turned on, the user may be given the option of selecting an audio track for play using a drop-down list 806 or other selector device. The user may also be given the option of selecting a venue to simulate audio track play in using a drop-down list 808 or other selector device.

If desired, the user may be given an option to select HRTF type, e.g., stereo, multi-channel, up-mix from stereo to multichannel, etc. using yet another drop-down list 810 or other selector device. In some embodiments the user may be presented with a tap selector 812 to input the number of FIR filter taps to use consistent with disclosure above.

While the particular embodiments are herein shown and described in detail, it is to be understood that the subject matter which is encompassed by the present invention is limited only by the claims.

What is claimed is:

1. An apparatus comprising:
at least one processor configured with instructions to:
receive at least first and second photographs of a person's ear from at least first and second camera positions;
based at least in part on the at least first and second photographs, generate a head-related transfer function (HRTF) to be applied to audio for the person's ear; and
present input option selectable by the person to select a HRTF type from a group of types comprising one or more of stereo, multi-channel, up-mix from stereo to multichannel.

2. The apparatus of claim 1, wherein the at least first and second photographs comprise a panoramic set of photographs of the person's ear.

3. The apparatus of claim 1, wherein the first and second photographs comprise a three-dimensional (3D) image of the person's ear.

4. The apparatus of claim 1, wherein the processor is instantiated in a network server receiving the series from an end user communication device.

5. The apparatus of claim 1, wherein the processor is instantiated in an end user communication device generating the series.

6. The apparatus of claim 5, comprising the end user communication device.

7. The apparatus of claim 6, wherein the end user communication device comprises at least first and second cameras configured to simultaneously image a region of a person to generate a 3D image.

8. A method, comprising:
receiving at least one photograph of a region of a person's ear, the at least one photograph comprising at least one three-dimensional (3D) image or at least two two-dimensional (2D) images from at least first and second camera positions;
based at least in part on the at one photograph, generating a head-related transfer function (HRTF) to be applied to audio for the person's ear; and
combining the HRTF with information pertaining to a virtual venue in which to simulate playing audio.

9. The method of claim 8, wherein the at least one photograph comprises a panoramic set of photographs of the person's ear.

10. The method of claim 8, wherein the at least one photograph comprises a three-dimensional (3D) image of the person's ear.

11. The method of claim 8, wherein the method is executed in a network server receiving the at least one photograph from an end user communication device.

12. The method of claim 8, wherein the method is executed in an end user communication device generating the at least one photograph.

13. The method of claim 10, wherein the 3D image is generated by an end user communication device comprising at least first and second cameras configured to simultaneously image a region of a person to generate a 3D image.

14. An apparatus comprising:
at least one processor
operable to access at least one database associating images of ears with respective head-related transfer functions (HRTFs); and
wherein the at least one processor is programmed with instructions to:
identify in at least one database a closest match to at least one image of a person;
return at least one HRTF associated with the closest match; and
play back audio using fewer than all taps of the HRTF.

15. The apparatus of claim 14, wherein the apparatus is configured to provide sound to at least one speaker using the at least one HRTF.

16. The apparatus of claim 14, wherein the at least one image comprises a panoramic set of photographs of a person's ear.

17. The apparatus of claim 14, wherein the at least one image comprises a three-dimensional (3D) image of a person's ear.

18. The apparatus of claim 14, wherein the at least one processor is implemented in a network server receiving the at least one image from an end user communication device.

19. The apparatus of claim 14, wherein the at least one processor is implemented in an end user communication device generating the at least one image.

20. The apparatus of claim 17, wherein the 3D image is generated by an end user communication device comprising at least first and second cameras configured to simultaneously image a region of a person to generate a 3D image.

\* \* \* \* \*